(12) United States Patent
Novozhenets et al.

(10) Patent No.: US 11,361,605 B2
(45) Date of Patent: Jun. 14, 2022

(54) ACCESS CONTROL SYSTEM WITH WIRELESS COMMUNICATION

(71) Applicant: Carrier Corporation, Palm Beach Gardens, FL (US)

(72) Inventors: Yuri Novozhenets, Pittsford, NY (US); Jason Higley, Pittsford, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 266 days.

(21) Appl. No.: 16/613,946

(22) PCT Filed: May 15, 2018

(86) PCT No.: PCT/US2018/032677
§ 371 (c)(1),
(2) Date: Nov. 15, 2019

(87) PCT Pub. No.: WO2018/213253
PCT Pub. Date: Nov. 22, 2018

(65) Prior Publication Data
US 2021/0358247 A1 Nov. 18, 2021

Related U.S. Application Data

(60) Provisional application No. 62/506,923, filed on May 16, 2017.

(51) Int. Cl.
*G07C 9/27* (2020.01)
*H04B 17/318* (2015.01)
(Continued)

(52) U.S. Cl.
CPC .............. *G07C 9/27* (2020.01); *G07C 9/28* (2020.01); *H04B 17/318* (2015.01);
(Continued)

(58) Field of Classification Search
CPC .......... G07C 9/28; H04W 4/80; H04W 4/029; H04W 12/08; H04W 12/63; H04B 17/318
(Continued)

(56) References Cited

U.S. PATENT DOCUMENTS 8,738,024 B1 5/2014 Kerr et al.
8,847,754 B2 9/2014 Buchheim et al.
(Continued)

FOREIGN PATENT DOCUMENTS

CA 2983081 * 12/2016
CA 2983081 A1 12/2016
(Continued)

OTHER PUBLICATIONS

International Search Report and Written Opinion for application PCT/US2018/032677, dated Aug. 21, 2018, 13 pages.
(Continued)

*Primary Examiner* — Omar Casillashernandez
(74) *Attorney, Agent, or Firm* — Cantor Colburn LLP

(57) ABSTRACT

An environment access control system that includes an operating environment including one or more access controlled locations, each of the location(s) secured with at least one entry point. Also included is a plurality of wireless signal generating devices each emitting a wireless signal to be received by a mobile device located within the operating environment. Further included is a network device determining a position of the mobile device and comparing the position of the mobile device to the at least one entry point to provide a simplified access request option to a user of the mobile device, the network device determining access to the one or more access controlled locations of the operating environment.

13 Claims, 1 Drawing Sheet

(51) Int. Cl.
  *H04W 4/029* (2018.01)
  *H04W 4/80* (2018.01)
  *G07C 9/28* (2020.01)
  *H04W 12/63* (2021.01)
  *H04W 12/08* (2021.01)

(52) U.S. Cl.
  CPC .............. *H04W 4/029* (2018.02); *H04W 4/80* (2018.02); *H04W 12/08* (2013.01); *H04W 12/63* (2021.01)

(58) Field of Classification Search
  USPC ................................................ 340/5.61, 5.16
  See application file for complete search history.

(56) References Cited

U.S. PATENT DOCUMENTS

| | | | |
|---|---|---|---|
| 8,996,037 B2 | 3/2015 | Chen et al. | |
| 9,066,327 B2 | 6/2015 | Liu | |
| 9,207,303 B2 | 12/2015 | Beidel | |
| 9,277,018 B2 | 3/2016 | Kotecha et al. | |
| 9,307,355 B2 | 4/2016 | Nehrenz et al. | |
| 9,326,226 B2 | 4/2016 | Bahram Pour | |
| 9,361,630 B1 | 6/2016 | Goswami | |
| 9,374,666 B1 | 6/2016 | Trouw et al. | |
| 9,374,667 B1 | 6/2016 | Jorgensen et al. | |
| 9,408,036 B2 | 8/2016 | Hart et al. | |
| 9,420,423 B1 | 8/2016 | Mendelson | |
| 9,420,562 B1 | 8/2016 | Cai et al. | |
| 9,473,901 B1 | 10/2016 | White | |
| 9,491,691 B2 | 11/2016 | Tailor et al. | |
| 9,510,318 B2 | 11/2016 | Gyorfi et al. | |
| 9,532,183 B2 | 12/2016 | Roth | |
| 9,544,744 B2 | 1/2017 | Postrel | |
| 9,551,775 B2 | 1/2017 | Rangarajan et al. | |
| 9,666,000 B1* | 5/2017 | Schoenfelder | G07C 9/257 |
| 2014/0237076 A1 | 8/2014 | Goldman et al. | |
| 2015/0194000 A1* | 7/2015 | Schoenfelder | G07C 9/00309 |
| | | | 340/5.61 |
| 2015/0289207 A1 | 10/2015 | Kubo et al. | |
| 2015/0350820 A1 | 12/2015 | Son et al. | |
| 2016/0080486 A1 | 3/2016 | Ram et al. | |
| 2016/0125319 A1 | 5/2016 | Morgan et al. | |
| 2016/0157046 A1 | 6/2016 | Weizman et al. | |
| 2016/0212582 A1 | 7/2016 | Jin et al. | |
| 2016/0286348 A1 | 9/2016 | Jorgensen et al. | |
| 2017/0019769 A1 | 1/2017 | Li | |
| 2017/0140592 A1* | 5/2017 | Pluss | G07C 9/0069 |
| 2018/0213370 A1* | 7/2018 | Pluss | H04W 12/08 |

FOREIGN PATENT DOCUMENTS

| | | |
|---|---|---|
| CN | 101894404 A | 11/2010 |
| CN | 103686613 A | 3/2014 |
| CN | 103745511 A | 4/2014 |
| CN | 105392111 A | 3/2016 |
| CN | 106170150 A | 11/2016 |
| WO | 2016089837 A1 | 6/2016 |
| WO | 2016165851 A1 | 10/2016 |
| WO | 2016178082 A1 | 11/2016 |
| WO | 2017013304 A1 | 1/2017 |

OTHER PUBLICATIONS

Chinese Office Action for Application No. 201880032540.4; dated Apr. 13, 2022; 9 Pages.

\* cited by examiner

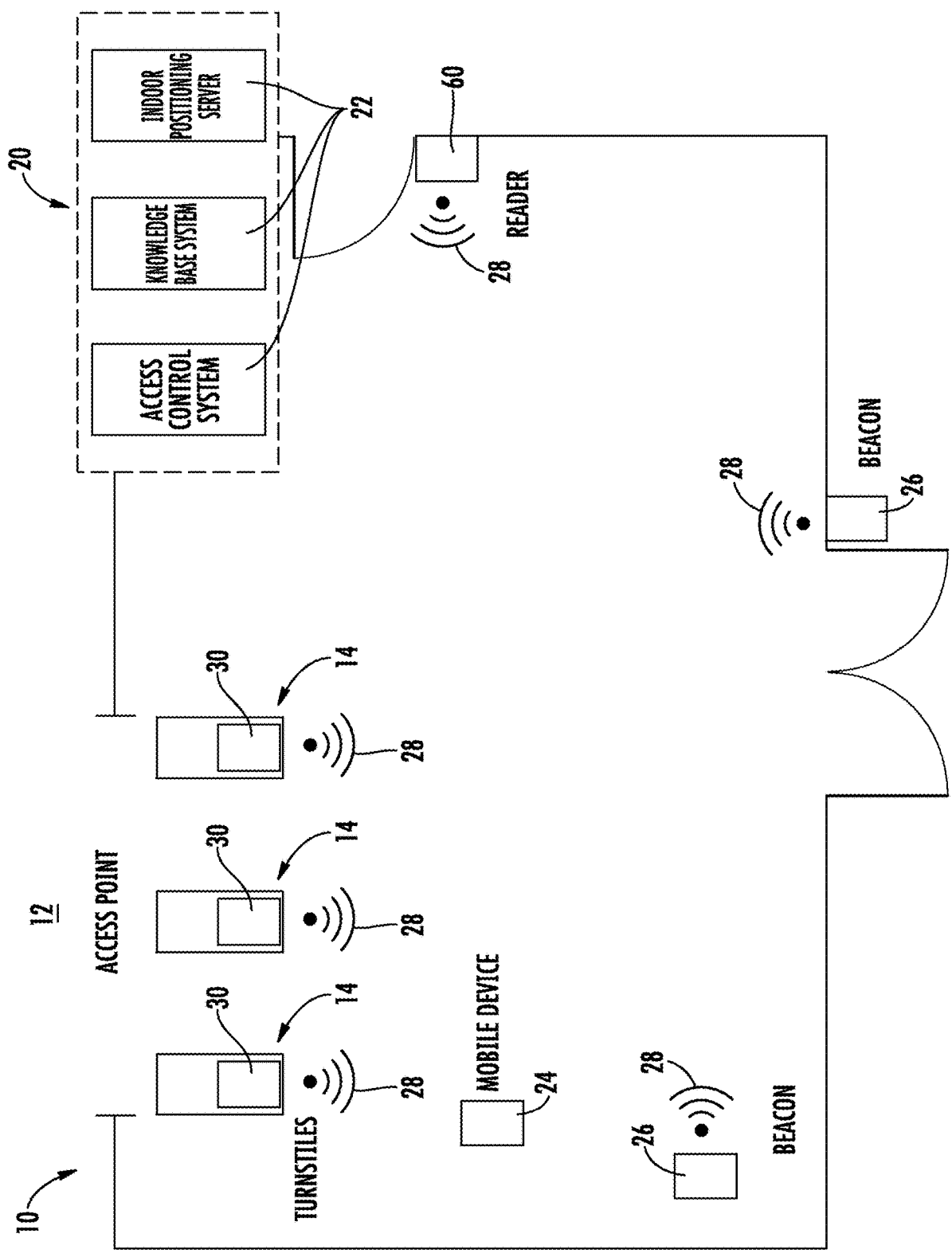

ACCESS CONTROL SYSTEM WITH WIRELESS COMMUNICATION

BACKGROUND

Building access control systems typically require a user to step into a specified area and subsequently request entry to a desired destination area of the building. The request may be performed offline with an encoded physical element, such as a key card, that indicates access rights (e.g., credentials) for the user. The key card, or the like, is detected by a reader and access, such as through a door, may be granted by unlocking and/or opening the door. An example is a hotel locking system in which a front desk worker encodes a guest card and an offline, battery powered lock on a guest room door decodes the key card and thus permits or denies access based on the encoded access rights. Some access control systems are generally operated in an online mode, where readers communicate with a centralized server of the access control system via a network to determine whether or not to grant access.

The above-described access control systems require a user to have knowledge of, or remember, a unique entry point name or location, thereby often frustrating an individual during the user experience.

BRIEF SUMMARY

Disclosed is an environment access control system that includes an operating environment including one or more access controlled locations, each of the location(s) secured with at least one entry point. Also included is a plurality of wireless signal generating devices each emitting a wireless signal to be received by a mobile device located within the operating environment. Further included is a network device determining a position of the mobile device and comparing the position of the mobile device to the at least one entry point to provide a simplified access request option to a user of the mobile device, the network device determining access to the one or more access controlled locations of the operating environment.

In addition to one or more of the features described above, or as an alternative, further embodiments may include one or more access points in operative communication with the network device, the access point(s) connecting the mobile device to the network device, wherein the network device is programmed with a coordinate location of the access point(s) to form a knowledge based system (KB S).

In addition to one or more of the features described above, or as an alternative, further embodiments may include that the access controlled location(s) is secured with a plurality of entry points, wherein the network device determines which of the plurality of entry points is to be employed by a user of the mobile device based on a location of the mobile device that is known from the KBS and a received signal strength indication (RSSI) of the mobile device.

In addition to one or more of the features described above, or as an alternative, further embodiments may include that the entry point determined is an entry point that is closest in proximity to the mobile device.

In addition to one or more of the features described above, or as an alternative, further embodiments may include that the plurality of wireless signal generating devices comprises at least one of a wireless beacon and a wireless reader.

In addition to one or more of the features described above, or as an alternative, further embodiments may include that the operating environment comprises at least one building.

In addition to one or more of the features described above, or as an alternative, further embodiments may include that the one or more access controlled location comprises at least one room of the building.

In addition to one or more of the features described above, or as an alternative, further embodiments may include that the one or more access controlled location comprises at least one elevator car of the building.

In addition to one or more of the features described above, or as an alternative, further embodiments may include that the one or more access controlled location comprises a floor destination of the elevator car.

In addition to one or more of the features described above, or as an alternative, further embodiments may include that the wireless signal generated by at least one of the plurality of wireless signal generating devices is a Bluetooth Low Energy (BLE) signal.

Also disclosed is a method of controlling access in an operating environment. The method includes generating a wireless signal with a plurality of wireless signal generating devices located in the operating environment having at least one access controlled location secured with a plurality of entry points. Also included is receiving the wireless signal with a mobile device when the mobile device is located within the operating environment. Further included is connecting the mobile device to a network device upon detection of advertisement by the mobile device after the mobile device receives an advertisement from the plurality of wireless signal generating devices. Yet further included is determining a position of the mobile device. Also included is comparing the position of the mobile device to the at least one entry point to provide a simplified access request option to a user of the mobile device. Further included is submitting an access request for the access controlled location. Yet further included is determining whether the access request should be granted or denied based on credentials stored on the mobile device.

In addition to one or more of the features described above, or as an alternative, further embodiments may include determining a position of the mobile device based on a coordinate location of each of the plurality of wireless signal generating devices that is programmed within the network device as a knowledge based system (KBS).

In addition to one or more of the features described above, or as an alternative, further embodiments may include determining which of the plurality of entry points is to be employed by a user of the mobile device based on the position of the mobile device that is known from the KBS and a received signal strength indication (RSSI) of the mobile device.

In addition to one or more of the features described above, or as an alternative, further embodiments may include that the entry point determined is an entry point that is closest in proximity to the user.

In addition to one or more of the features described above, or as an alternative, further embodiments may include that a user of the mobile device initiates the access request by interacting with the mobile device.

In addition to one or more of the features described above, or as an alternative, further embodiments may include that a user of the mobile device initiates the access request by inputting predetermined settings into the mobile device.

In addition to one or more of the features described above, or as an alternative, further embodiments may include that the wireless signal generated by at least one of the plurality of wireless signal generating devices is a Bluetooth Low Energy (BLE) signal.

BRIEF DESCRIPTION OF THE DRAWINGS

The present disclosure is illustrated by way of example and not limited in the accompanying figures in which like reference numerals indicate similar elements.

FIG. 1 illustrates an environment in an example embodiment.

DETAILED DESCRIPTION

FIG. 1 depicts an environment 10 in an example embodiment. In some embodiments, the environment 10 is a building, a part of a building, or a collection of buildings that are physically located near each other. The environment 10 includes one or more access controlled locations 12. The access controlled locations 12 may be rooms or otherwise enclosed spaces that are secured with at least one entry point 14, such as the illustrated turnstiles, however, any entry barrier such as doors may be employed. The entry point(s) 14 are typically in a locked condition and access must be granted to a user in response to an access request. Each access controlled location 12 may be accessible with one or more entry points. For example, one access controlled location may be accessible via a single entry point, while other access controlled locations may be accessible via a plurality of entry points, as shown in FIG. 1.

In addition to the building environment described above, the embodiments described herein may be applicable to an outdoor setting with access controlled areas or to a building with an elevator system. In the case of the elevator system, certain elevator cars or floor destinations of the building may be access controlled, such that an access request must be granted by the access control system described herein.

An access control system 20 is illustrated. The access control system 20 may include one or more network devices 22, such as a controller or server, for example. The network device is configured to control access operations for the access controlled location(s) 12 of the access control system 20. It is understood that the access control system 20 may utilize more than one network device 22, and that each network device 22 may control a group of access controlled locations 12.

Also illustrated is a mobile device 24. The mobile device 24 may include a device that is carried by a person, such as a smart phone, PDA, tablet, etc. The mobile device 24 may include wearable items, such as a smart watch, eyewear, etc. The mobile device 24 may include a processor, memory and a communication module. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in the mobile device 24 including executable instructions stored therein, for instance, as firmware. The communication module may implement one or more communication protocols, but must support a Bluetooth low energy (BLE) role, as described in further detail herein.

The network device 22 may include a processor, memory and a communication module. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in the network device 22 including executable instructions stored therein, for instance, as firmware. The communication module may implement one or more communication protocols, but must support BLE communication, as described in further detail herein.

In an embodiment, the mobile device 24 functions as a BLE central device and one or more devices of the access control system 20 functions as a BLE peripheral device, with the mobile device 24 initiating communication and interaction with the access control system 20, as will be appreciated from the disclosure herein. It is contemplated that the roles may be reversed, such that the mobile device is a BLE peripheral device and one or more devices of the access control system 20 functions as a BLE central device. In the access control system 20 disclosed herein, connection and processing of information is made from as many mobile devices as possible, via the wireless communication Bluetooth low energy (BLE).

The access control system 20 includes at least one, but typically multiple wireless signal generating devices 26 disposed in the environment 10. The wireless signal generating devices 26 may be beacons or the like, and capable of emitting a BLE signal 28 that BLE-enabled mobile devices can search for, such as the mobile device 24 described herein, to trigger the mobile device 24 to enter a connection mode with the access control system 20. Upon receipt of the BLE signal 28, the mobile device 24 advertises its presence with an additional BLE signal that is detectable by one or more access points 30 that are located proximate the environment 10. The access point(s) 30 are routers or a similar wireless device configured to detect the signal from the mobile device 24 and that is in operative communication with the network device 22. The access point(s) 30 indirectly place the mobile device 24 into connection with the network device 22. The network device 22 may be located on-site (proximate environment 10) or remotely located.

The mobile device 24 can also advertise its presence upon a user opening an application on the mobile device 24, or with the application open the advertising could be set to start only upon the user entering an access request within the application on the mobile device 24. The mobile device 24 is connectable to the wireless signal generating devices 26 and the network device 22 when located proximate the environment 10. In some embodiments, the mobile device 24 is connectable to the components when located within 100 feet, for example. It is to be appreciated that this distance/range is an illustrative range and some embodiments will permit connection with larger or smaller ranges.

Upon connection with the network device 22, the mobile device 24 advertises with a credential recognizable by the network device 22, with data stored on the mobile device 24 that is access request context data. As described above, the access request may be initiated by user interaction with the mobile device 24 or may be automatically initiated based on predetermined settings programmed into the mobile device 24 by the user or another individual. Once the network device 22 and the mobile device 24 are connected, the access control system 20 determines a position of the mobile device 24. This is done based on the ability of the mobile device 24 to store the signal strength of each BLE device (e.g., wireless signal generating devices 26) and by using a positioning algorithm that determines the coordinates of the mobile device 24. The coordinates are three dimensional (x-y-z) in some embodiments, similar to latitude, longitude and altitude. Based on a dictionary that defines relative positioning that is defined by a knowledge based system (KBS) 32 that is programmed in the network device 22 and on a received signal strength indication (RSSI) of the mobile device 24 relative to one or more devices of the access control system 20, such as the access point(s) 30 and/or the network device 22. The KBS comprises programmed coordinates of the system devices, such as the wireless signal generating devices 26 and the access point(s) 30, for example. This information, when combined with the relative position of the mobile device 24, is used to determine which entry point 14 is to be utilized. As described above, this may be based solely on the closest entry point available or may consider other factors, such as the number of users currently entering various entry points.

The relative position of the mobile device 24 may also be achieved in various alternative manners, as described below. The mobile device 24 can receive and rebroadcast signal details, with the server then determining the position and entry point. The mobile device 24 can receive the signal and trilaterate on the mobile device to send positioning, with the server sending to the entry point. The mobile device can receive, and trilaterate on the mobile device, then the position is checked based on a dictionary stored on the mobile device of all devices. The mobile device can receive and trilaterate on the mobile device, then the position is checked based on a dictionary that was updated based on last access or additional GPS information. In this situation, the user doesn't have a full list of devices, only those they can interact with.

The disclosed embodiments provide a user of the mobile device 24 with a simplified option for making an access request. For example, if a user desires to enter a specific entry point 14 and is positioned proximate the desired entry point, the access control system 20 recognizes the position of the mobile device 24 and determines authorization for access to that entry point 14. If authorization is permitted, the access control system 20 indicates on a mobile device 24 interface (e.g., screen, audible prompt, etc.) only the entry point 14 that the user is positioned proximate to. This alleviates the burden on the user to recognize which name on a list of entry points 14 or access controlled locations 12 is desired. It is contemplated that a user has access to multiple access controlled locations 12 or entry points 14, but the position knowledge described above reduces the number of options provided to the user. The user can then make the final access request in a more efficient and less burdensome manner. Once the network device 22 receives the access request, the network device 22 grants or denies the access request. If granted, at least one of the entry points 14 is switched to an unlocked condition, thereby allowing the user to enter one of the access controlled locations 12. The presentation of a simplified access request option is based on the determined position of the mobile device 24 and the access credentials of the mobile device 24.

In some embodiments, when user intent is identified, through gesture, button press, etc., the requesting device sends an authorization request command to the access control system 20 (including access credential and access device ID). The access control system 20 validates the request and sends access device adjustment, such as door opening, if valid.

In some embodiments, user intent is identified, through gesture, button press, etc., the requesting device sends an authorization request command to the access point 30 (including access credential). The access point 30 sends a request to the authorization service (panel or access control system) which validates the request and sends access device adjustment, such as door opening, if valid.

In some embodiments, the mobile device stores the signal strength of each BLE device. When user intent is identified, through gesture, button press, etc., the requesting device sends a command to the knowledge base system that determines relative position and determines the x-y-z position of the device. Based on a dictionary that defines relative positioning (KBS), the access points and devices, the closest reader 60 is determined. The device ID is sent back to the mobile device 24. The mobile device 24 then connects and communicates the credential to the identified access device.

In addition to simply granting access to the user, the access control system 20 may direct the user to a specific entry point 14. This is particularly beneficial for access controlled locations 12 having multiple entry points 14 (e.g., doors, elevator car options, etc.). The entry point 14 selected may be based on positioning of the mobile device 24 and/or a flow efficiency of many users entering the access controlled location 12.

In operation, the access control system 20 provides users in the operating environment 10 with a seamless and interactive access request experience. Advantageously, the access control system 20 allows a user to step into the environment and receive the granting of access without interacting with anything other than their mobile device 24 and even then only doing so in a minimalistic fashion.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. An environment access control system comprising:
   an operating environment including one or more access controlled locations, each of the location(s) secured with at least one entry point;
   a plurality of wireless signal generating devices each emitting a wireless signal to be received by a mobile device located within the operating environment; and
   a network device determining a position of the mobile device and comparing the position of the mobile device to the at least one entry point to provide a simplified access request option to a user of the mobile device, the network device determining access to the one or more access controlled locations of the operating environment;

one or more access points in operative communication with the network device, the access points connecting the mobile device to the network device, wherein the network device is programmed with a coordinate location of the access points to form a knowledge based system (KBS);

wherein the access controlled locations are secured with a plurality of entry points, wherein the network device determines which of the plurality of entry points is to be employed by a user of the mobile device based on a location of the mobile device derived from received signal strength indications (RSSI) at the mobile device based on signals from the plurality of wireless signal generating devices.

2. The environment access control system of claim 1, wherein the entry point determined is an entry point that is closest in proximity to the mobile device.

3. The environment access control system of claim 1, wherein the plurality of wireless signal generating devices comprises at least one of a wireless beacon and a wireless reader.

4. The environment access control system of claim 1, wherein the operating environment comprises at least one building.

5. The environment access control system of claim 4, wherein the one or more access controlled location comprises at least one room of the building.

6. The environment access control system of claim 4, wherein the one or more access controlled location comprises at least one elevator car of the building.

7. The environment access control system of claim 6, wherein the one or more access controlled location comprises a floor destination of the elevator car.

8. The environment access control system of claim 1, wherein the wireless signal generated by at least one of the plurality of wireless signal generating devices is a Bluetooth Low Energy (BLE) signal.

9. A method of controlling access in an operating environment comprising:
   generating a wireless signal with a plurality of wireless signal generating devices located in the operating environment having at least one access controlled location secured with a plurality of entry points;
   receiving the wireless signal with a mobile device when the mobile device is located within the operating environment;
   connecting the mobile device to a network device upon detection of advertisement by the mobile device after the mobile device receives an advertisement from the plurality of wireless signal generating devices;
   determining which of the plurality of entry points is to be employed by a user of the mobile device based on the position of the mobile device that is derived from received signal strength indications (RSSI) at the mobile device based on signals from the plurality of wireless signal generating devices;
   providing a simplified access request option to a user of the mobile device;
   submitting an access request for the access controlled location; and
   determining whether the access request should be granted or denied based on credentials stored on the mobile device.

10. The method of claim 9, wherein the entry point determined is an entry point that is closest in proximity to the user.

11. The method of claim 9, wherein a user of the mobile device initiates the access request by interacting with the mobile device.

12. The method of claim 9, wherein a user of the mobile device initiates the access request by inputting predetermined settings into the mobile device.

13. The method of claim 9, wherein the wireless signal generated by at least one of the plurality of wireless signal generating devices is a Bluetooth Low Energy (BLE) signal.

* * * * *